United States Patent
Thaniyavarn (10) Patent No.: US 8,582,927 B1
(45) Date of Patent: Nov. 12, 2013

(54) HIGH-EFFICIENCY OPTICAL MODULATORS AND IMPLEMENTATION TECHNIQUES

(75) Inventor: Suwat Thaniyavarn, Bellevue, WA (US)

(73) Assignee: EOSpace, Inc., Redmond, WA (US)

(*) Notice: Subject to any disclaimer, the term of this patent is extended or adjusted under 35 U.S.C. 154(b) by 0 days.

(21) Appl. No.: 12/590,706

(22) Filed: Nov. 12, 2009

Related U.S. Application Data (60) Provisional application No. 61/198,974, filed on Nov. 12, 2008.

(51) Int. Cl.
   *G02F 1/035* (2006.01)
(52) U.S. Cl.
   USPC .................................................. 385/2
(58) Field of Classification Search
   USPC .................................................. 385/2
   See application file for complete search history.

(56) References Cited

U.S. PATENT DOCUMENTS

| | | | |
|---|---|---|---|
| 6,091,864 A * | 7/2000 | Hofmeister | 385/2 |
| 6,504,632 B1 * | 1/2003 | Watanabe et al. | 398/87 |
| 6,545,791 B1 * | 4/2003 | McCaughan et al. | 359/245 |
| 2002/0076161 A1 * | 6/2002 | Hirabayashi et al. | 385/40 |
| 2006/0088984 A1 * | 4/2006 | Li et al. | 438/463 |
| 2011/0033150 A1 * | 2/2011 | Tan et al. | 385/14 |

* cited by examiner

*Primary Examiner* — Ryan Lepisto
*Assistant Examiner* — Jerry Blevins
(74) *Attorney, Agent, or Firm* — James Creighton Wray (57) ABSTRACT

A new High-Z optical modulator has a waveguide and electrodes on a substrate, a buffer layer with a low dielectric constant between the waveguide and the substrate, and a substance between the waveguide and the substrate with a dielectric constant lower than a dielectric constant of the substrate to the side and below the plane of the waveguide, thereby improving electro-optic field overlap, increasing RF speed and increasing transmission line impedance. The material with a dielectric constant lower than the substrate extends between the waveguide and the electrodes to a depth below the waveguide equal to or greater than the lateral distance between the waveguide and electrodes. This material may be air and may be introduced by cutting away portions of the substrate around the waveguide with a precision dicing saw. The electrodes may be placed even with the waveguide or below the waveguide on the cut-away portion of the substrate.

19 Claims, 10 Drawing Sheets

HIGH-EFFICIENCY OPTICAL MODULATORS AND IMPLEMENTATION TECHNIQUES

This application claims the benefit of U.S. Provisional Application No. 61/198,974, filed Nov. 12, 2008, which is hereby incorporated by reference in its entirety.

BACKGROUND OF THE INVENTION

An optical modulator is a device that converts electrical signals to optical signals for various applications. Currently, the most widely used optical modulators are the electro-optic lithium niobate ($LiNbO_3$) waveguide modulators using traveling-wave (TW) transmission line electrode structures. The structures are designed to achieve velocity-matching conditions of the modulating radio frequency (RF) signals and the optical waves co-propagating down the waveguide circuits to achieve maximum electro-optic interaction. One of the most important optical modulator performance parameter is the electro-optic conversion efficiency.

It has long been universally assumed that a TW transmission line electrode should be designed so that the characteristic impedance is matched as closely as possible to the source drive circuit's transmission line (typically 50Ω) to maximize the electrical signal power transfer to the TW electrode. That design is used for all wide-bandwidth modulators fabricated on any electro-optic material, including $LiNbO_3$, other ferroelectric material, polymer, semiconductor, etc. There are ample works on traveling-wave electro-optic modulators for the last 20-30 years, and their design and operation are widely published in literature.

Optical modulators and switches and all electro-optical devices can be used to electro-optically modulate and switch optical signals. Those optical devices are generally used in fiber-optic systems, optical communications, optical sensors, etc. for both digital and analog applications. Current optical waveguide modulators/switches are based on electro-optic effect in Lithium niobate, other ferroelectric material, polymers, semiconductors, etc. Those devices are commercially available and are being used in optical systems such as broadband digital fiber-optic communications networks, RF analog fiber-optic links, optical sensing, etc.

Optical modulators with conventional designs are being offered by various companies including EOSPACE, JDS Uniphase, Avanex, Sumitomo Cements, Fujitsu, Lumera, Plotline, etc.

An Optical modulator is the key optical component that converts electrical signals into optical signals. An optical switch is used to switch the light signal to different paths. There is always a need to improve the electro-optic conversion/switching efficiency of these devices to improve sensitivity of the optical systems utilizing them.

Current optical modulators are not yet efficient enough (i.e. high drive voltage) to be used for a variety of more demanding applications. Current wideband RF analog fiber-optic links are not sensitive enough for many critical applications, such as those required by advanced fiber-optic antenna remoting for military sensing and surveillance systems. The performances of those RF fiber-optic links are primarily limited by high noise figures and limited sensitivity. Optical modulators with much higher electrical to optical conversion efficiency (i.e. drive voltage) are needed to improve those fiber-optic links' performance.

Broadband optical modulators for digital high-bit-rate fiber-optic systems require low drive voltage so that a lower cost large bandwidth drive amplifier, with lower power consumption, size, and weight, can be used.

In order to achieve both velocity-matching and 50Ω impedance-matching conditions for a traveling-wave optical modulator, it is typically required to make various design and fabrication compromises, resulting in non-optimum efficiency and bandwidth. For example, with the most widely used $LiNbO_3$ TW modulator, the $LiNbO_3$ material itself has very high dielectric constants ($\in 11\sim44$, $\in 33\sim28$). That problem not only results in a slow RF signal propagation speed, as compared to that of the light wave signals, but also results in a low transmission line impedance (typically well below 50Ω). That often requires trade-offs with device efficiency, RF bandwidth, etc.

Needs continue to exist for improved electro-optical modulators.

SUMMARY OF THE INVENTION

The new EOSPACE unique approach to significantly improve optical modulator efficiency is a modulator that uses a traveling-wave (TW) electrode structure with an unconventionally high characteristic impedance (High-Z, Z=Characteristic Impedance) transmission line electrode structure, higher than 50 ohm.

This novel device has an advantage of achieving a unique voltage conversion gain feature, as compared to conventional TW modulators that are designed to be as close as possible to 50Ω. This new modulator can be used for TW modulators fabricated in any electro-optic material system (ferroelectric, polymer, semiconductor, etc.)

A very high efficiency, broadband, optical modulator is the key optical component for high-bit-rate digital fiber-optic systems, RF analog fiber-optic links, and other optical systems, sensors, instruments, etc. that require the need for efficient electro-optic conversion of electrical signals into optical signals.

The largest market is in broadband digital fiber-optic systems. A very high efficiency modulator will allow the use of lower-cost, lower-voltage drive amplifiers, which makes such devices extremely attractive for implementation.

For RF analog fiber-optic link, a very high-efficiency modulator can be the enabler, making these fiber-optic links with improved sensitivity and making them feasible for large-scale deployment.

All firms that are engaging in optical systems, especially fiber-optic systems, and optical component suppliers need improved modulators. Since optical modulators are the key components required to convert electrical signals to optical signals, higher efficiency leads to higher sensitivity systems. These key features will make their components and systems more efficient and thus more competitive. With much more sensitive device, new systems and applications are possible, resulting in new markets.

With the most widely-used $LiNbO_3$ TW modulators, it has long been assumed that a TW transmission line electrode having 50Ω characteristic impedance should be close to ideal for achieving the highest modulator efficiency, since all the power is transferred from the 50Ω source to the modulator's TW transmission line (T-line) electrode.

However, this invention shows that this is actually not the case. That is due to the fact that the electro-optic TW modulator's efficiency is related fundamentally to the voltage conversion first and power conversion is secondary. The efficiency of the TW electrode to modulate the optical signal depends on the forward-propagation voltage transfer from the driving source transferring to the modulator TW T-line.

The innovative invention uses practical technology to achieve truly state of the art extremely-low drive voltage Vπ LiNbO$_3$ waveguide modulators. The invention provides a novel device and operational concept, and novel geometries and fabrication techniques that are practical to implement and compatible with high-yield, low-cost, manufacturing process.

The invention provides a new operational process in ultra-high efficiency modulators and produces High-Z impedance traveling wave LiNbO$_3$ modulators with unique voltage-conversation-gain features, which lead to very significant improvements in modulator efficiency.

To realize this new High-Z modulator, this new type of modulators uses novel device geometries, tall thin ridge structures with deep trenches, eliminating the unnecessary high-dielectric (high ∈) LiNbO$_3$ material around the waveguide.

To realize such structures, a practical fabrication system uses very simple and fast mechanical techniques, compatible with low-cost manufacturing process.

Conventional LiNbO$_3$ traveling-wave modulators are replaced by non-conventional High-Z LiNbO$_3$ TW modulators fabricated on thin LiNbO$_3$ ridge structures with deep trenches.

Very highs LiNbO$_3$ material (∈~44) surrounding waveguide is removed and replaced with low ∈ material, such as air, ∈~1. High impedance (Z>50Ω) traveling-wave electrode structure produces a unique large voltage conversion gain structure and a lower Vπ as compared with conventional LiNbO$_3$ traveling-wave and broadband modulators. Velocity-matched co-propagating RF optical signals traveling-wave transmission line electrode structure achieves improved wide bandwidth and high efficiency modulator operation.

Very low Vπ LiNbO$_3$ modulators (Vπ~1V) are achieved with long-low loss traveling-wave electrode structures as compared with prior art thick electrodes and large spacing with planar or shallowly-etched wafers.

A fundamental issue with LiNbO$_3$ is that it has a very high dielectric constant ∈~44, resulting in traveling-wave with slow RF velocity mismatched with the optical wave and very low impedance.

To achieve broadband operation with prior art modulators, electrode parameters have to be compromised to achieve velocity matching between the RF and optical signals. That results in the need for very thick electrodes (25→50 μm) with large electrode gaps (30-50+μm), which results in a decrease in EO interaction for the RF electrode as compared to DC electrode.

Most of the E fields are still in the high ∈ LiNbO$_3$ material, and therefore results in low impedance ~30-40Ω transmission lines are mismatched with the standard 50Ω input. That results in voltage conversion loss (higher Vπ) by ~9-25% for Z=40 and 30Ω, respectively. The new EOSpace Inc. solution is to eliminate high-∈ material all around the waveguide to improve EO field overlap, increase RF speed and increase transmission line impedance.

One of the advantages of the High-Z modulator is voltage conversion gain. In conventional TW modulators with planar or shallowly etched structures, most of the E fields are in very high-∈ region of LiNbO$_3$. Therefore, current TW electrodes have low-Z transmission-line characteristics, typically in the range of ~30-40Ω. This leads to a higher drive voltage, due to a fundamental voltage conversion loss with a standard 50Ω RF drive system.

New TW modulators can be designed to achieve a higher-Z (>50Ω), to achieve a voltage conversion gain with a standard 50Ω drive system, effectively increasing EO conversion efficiency and lowering the drive voltage.

Advantages of High-Z modulator structures over conventional TW planar or shallowly-etched modulator structures are several. High ∈ of LiNbO$_3$ results in poor RF/optical wave velocity matching. To compensate for high ∈, a thick buffer layer (H) between the electrode/waveguide, decreased in EO interaction strength was needed.

In the new High-Z TW modulators, a high ∈ region is replaced by a very low ∈ material. There is no need for a thick buffer layer (H) to compensate and to speed-up RF signals. A much thinner buffer layer (h) can be used.

Increasing EO interaction strength lowers Vπ. One of the advantages of the new High-Z modulator structure is increased EO interaction strength. In conventional TW modulators having planar or shallowly etched structures, high ∈ of LiNbO$_3$ results in a very low impedance transmission-line to compensate for high-∈. A larger electrode gap is needed to decrease E field strength inside the waveguide. Narrower electrode width is needed to decrease EO overlap inside the waveguide. In the new High-Z TW modulator a high ∈ region is replaced by very low ∈ material. A smaller electrode gap can be used, which increases E field strength and lowers Vπ. A wider electrode width can be used, which increases E overlap and lowers Vπ. The wider electrode/gap ratio lowers RF dielectric loss, producing larger BW and lower Vπ.

One of the advantages of the new High-Z modulator structure is increased EO interaction strength. In conventional TW planar or shallowly etched modulator structures, E field direction along the extraordinary axis in the waveguide region is not optimum and has lower EO interaction strength.

In the new High-Z TW modulator a high ∈ region is replaced by very low ∈ material. With the tall ridge structure, E field is much better directed along the extraordinary axis in the waveguide region, producing higher EO interaction strength. A smaller width ridge structure can be used to provide much lower index around the waveguide. The waveguide confinement factor as well as the applied E field can be greatly enhanced for higher EO interaction strength.

The new thin tall vertical ridge structure is fabricated with deep trenches in LiNbO$_3$ substrates. The thin tall vertical ridge structure with deeply cut trenches on LiNbO$_3$ substrate can be fabricated with very simple mechanical techniques, using manufacturing grade high precision dicing saws, without altering or damaging the crystal region where the waveguide resides at the top of the ridge. Thus, all crystal properties and EO coefficients are preserved. The rest of the substrate is still intact. A rigid structure is provided, which leads to more robustness in handling and post processing of the device, unlike thin-film LiNbO$_3$ epitaxial layer approaches, with extremely fragile platforms or substrate wafer-scale polishing techniques to achieve thin LiNbO$_3$ layers.

The invention provides low loss single mode optical waveguides on very thin vertical ridge structures on LiNbO3. Simple techniques are provided for forming the tall and thin (~15-30 μm wide) ridge structures with very deep trenches (>50-250 μm).

The very low-loss waveguide at the top of the ridge has negligible excess loss. The measured fiber waveguide is <1.6 dB ~5-cm long sample with no AR coating, the same as normal waveguide channels without a fabricated ridge.

Fabrication of ridge structures with deep trenches in LiNbO$_3$ uses high precision dicing saws. Advanced fabrication creates very-thin lithium niobate ridge structures by removing the very high ∈ LiNbO$_3$ material around the waveguide. That allows the new electrode structures by with E field more accessible to waveguide regions from all sides. The invention allows more efficient field directional alignment, increases overlap integral, lowers the overall ∈ of the LiNbO$_3$ structure by replacing the material with air gaps (∈+~1), lowers microwave loss structure, increases electrode impedance and allows smaller electrode gap, all increasing efficiency.

In one embodiment, the material with a dielectric constant lower than the substrate is air. The material with a dielectric constant lower than the substrate may have a much lower dielectric constant than the electro-optic substrate itself. In one embodiment, the waveguide and electrodes are at the same height. The material with a dielectric constant lower than the substrate may extend below the electrodes in this embodiment. In another embodiment, the electrodes are lower than the waveguide, and the bottoms of the electrodes are at the same level as the bottom of the material with a dielectric constant lower than the substrate.

The substrate may be made of LiNbO$_3$ or a semiconductor, polymer, or ferroelectric material. The substrate may have a vertical ridge around the waveguide. The ridge may be 5-30 µm wide with a trench of greater than 30 µm depth. The trench may have a depth of 100 to 250 µm. The ridge may be integral with and supported by a remainder of the substrate, providing a robust structure for easy handling and post processing.

The transmission line characteristic impedance of the optical modulator may be greater than 50Ω. The lateral distance between the waveguide and the electrodes may be less than 25 µm. The electrodes may be wider and thinner than in a conventional optical modulator, and the buffer layer may be thinner in a conventional optical modulator.

In a new High-Z optical modulator method, a waveguide is formed on the substrate, electrodes are attached on the substrate, and a vertical ridge structure is formed around the waveguide by removing substrate material around the waveguide without altering or damaging the crystal region where the waveguide resides. In forming a vertical ridge structure around the waveguide, the substrate and one or more precision dicing saws may be aligned, and trenches may be cut on either side of the waveguide with the one or more dicing saws. In forming a waveguide on the substrate, a high temperature diffused waveguide process may be used. The electrodes may be attached at the bottom of the trenches. The elements of this method do not necessarily need to be performed in the order listed.

In a new High-Z optical modulator method, a substrate that has a waveguide on its surface and one or more precision dicing saws are aligned, and trenches are cut on either side of the waveguide with the one or more dicing saws, thereby forming a vertical ridge structure around the waveguide by removing substrate material around the waveguide.

These and further and other objects and features of the invention are apparent in the disclosure, which includes the above and ongoing written specification, with the claims and the drawings.

DETAILED DESCRIPTION OF THE DRAWINGS

Figure 1:
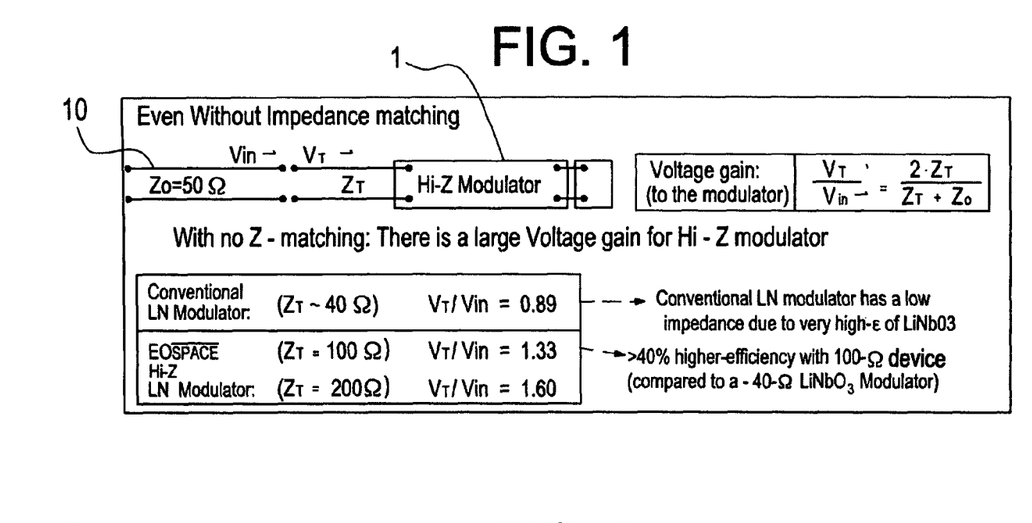
FIG. 1 shows unique voltage conversion gain features of a High-Z modulator.

FIG. 1 shows gain in the forward propagating voltage transferring from a 50 ohm source 10 to a high impedance TW electrode on the modulator 1, in the case where no impedance matching is used. The new invention is a modulator with TW transmission line electrode with higher impedance than that of the typical 50Ω source. This results in a higher efficiency modulator due to the gain in the forward propagating radio frequency (RF) voltage transferring to the modulator TW transmission line electrode.

For a typical conventional commercial LiNbO$_3$ TW modulator with a lower ~30-40Ω characteristic impedance than 50Ω) transmission line, there is a large forward-propagation voltage transmission loss from the 50Ω drive source to the TW electrode on the device. This problem results in a poorer efficiency, with a ~12-33% higher Vπ, as compared to a 50Ω-TW modulator. The lower the TW impedance, the higher the Vπ is. (Vπ is the commonly-used reference voltage required to electro-optically induce a π-phase shift in the optical signal of a phase modulator, and an "On-Off" voltage for a typical Mach-Zehnder interferometric intensity modulator). The lower the Vπ, the higher efficiency of the modulator.

In this invention, EOSPACE's high-impedance TW modulator achieves a voltage-conversion-gain with 29% lower Vπ with a 100-Ω TW modulator with respect to a 50Ω-TW modulator, and even lower Vπ with a higher impedance TW modulator. A factor of 2 in Vπ reduction is provided for a TW modulator with a characteristic impedance of 200Ω).

Figure 2:
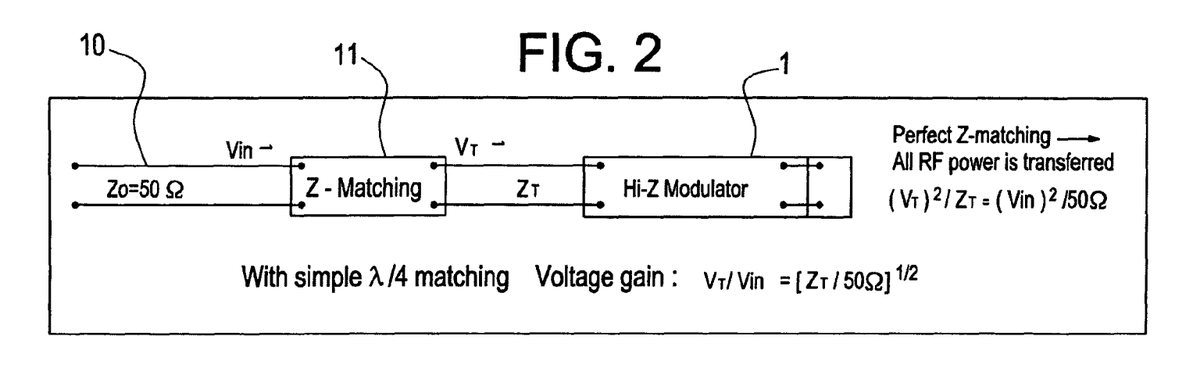
FIG. 2 shows a High-Z modulator, with simple quarter wave impedance matching.
Figure 3:
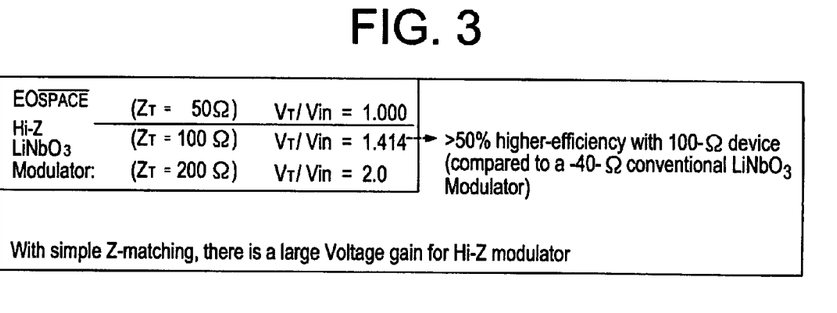
FIG. 3 shows that, with simple Z-matching, there is a large voltage gain for High-Z modulator.

FIG. 2 adds a simple quarter-wave impedance matching 11. FIG. 3 shows propagating voltage transfer gain from a 50 ohm source to a high impedance TW electrode on the modulator, with simple quarter-wave impedance matching. Impedance matching between the industry-standard 50Ω driving source and EOSPACE's High-Z TW transmission to achieve even higher modulation efficiency, improving gain-bandwidth across a large fraction of the bandwidth and keeping low $S_{11}$ microwave reflection. FIGS. 2 and 3 show forward propagating voltage transfer gain from a 50 ohm source to a high impedance TW electrode on the modulator, with simple quarter-wave impedance matching.

Figure 4:
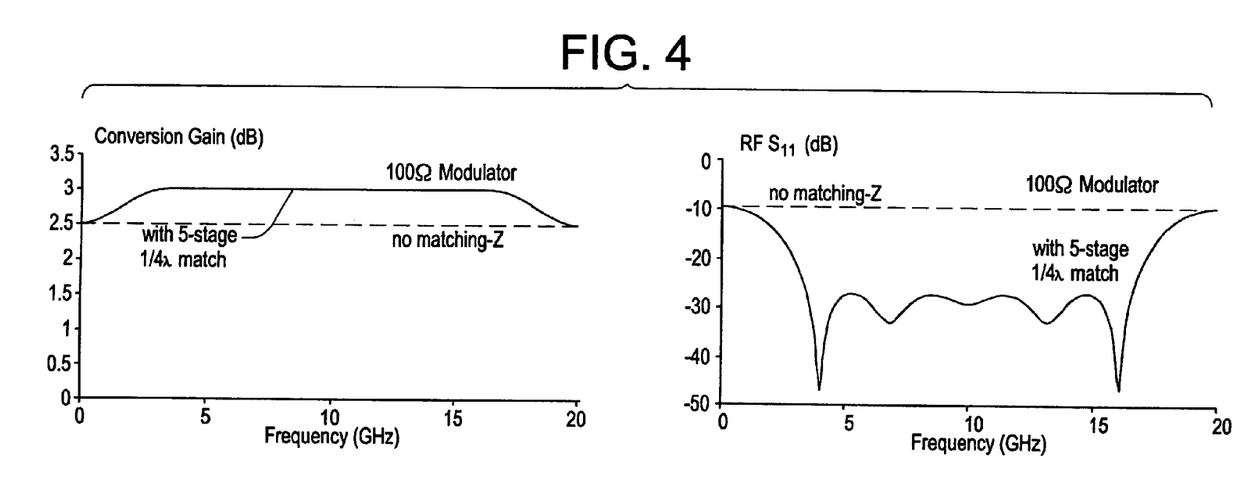
FIG. 4 shows a calculated electro-optic conversion gain of a High-Z modulator with 5-stage of impedance matching transmission-line.

Another example, with a more advanced impedance matching uses a 5-stage quarter-wave section with (54Ω→60Ω→70.7Ω→80Ω→92Ω) of transmission line matching, the voltage conversion gain and $S_{11}$ of a 100Ω-TW modulator driven by a 50Ω source. FIG. 4 shows the voltage transfer gain (from a 50 ohm source to a 100 ohm Transmission-line electrode on the modulator using this 5-stage matching section. A flat ~3 dB gain is achieved with low RF S11 reflection as shown.

This unconventional High-Z TW modulator represents a very significant break-through in modulators. This High-Z traveling-wave modulator can be used not only for $LiNbO_3$ device, but also for devices base on semiconductor, polymer, other ferroelectric material, etc. Basic structures for the high-impedance TW modulator are provided. In order to realize a High-Z TW modulator, the conventional device structure has to be modified.

In this invention, a new modified modulator structure is used to achieve a High-Z TW modulator device. These structures are discussed for the most common $LiNbO_3$ TW modulators. Similar device structures are applicable to other material systems as well.

Using $LiNbO_3$-based TW modulator devices as examples, the $LiNbO_3$ material itself has a very high dielectric constants (∈11~44, ∈33~28). This issue results in not only a slow RF signal propagation speed, as compared to that of the light wave signal, but also results in a very low transmission line characteristic impedance, typically lower than 50Ω. This issue results in poor modulation efficiency, due to forwarding voltage transfer loss from a 50Ω source to the low impedance TW transmission line.

In order to realize a High-Z modulator in $LiNbO_3$, the modulator is fabricated on a very tall/thin $LiNbO_3$ ridge structure accompanied with deep trenches. Most of the unwanted very high ∈ $LiNbO_3$ material (∈~44) surrounding the waveguide is removed and replaced with very low-dielectric material, such as air (∈~1). The trench should be deep as compared to the TW electrode spacing, so that the microwave signal sees mostly lower dielectric material. The new EOSPACE high impedance TW $LiNbO_3$ modulator structure fabricated on a tall thin ridge with very deep trench cut. Most of the unnecessary high dielectric material is removed from the region around the waveguide.

Figure 10:
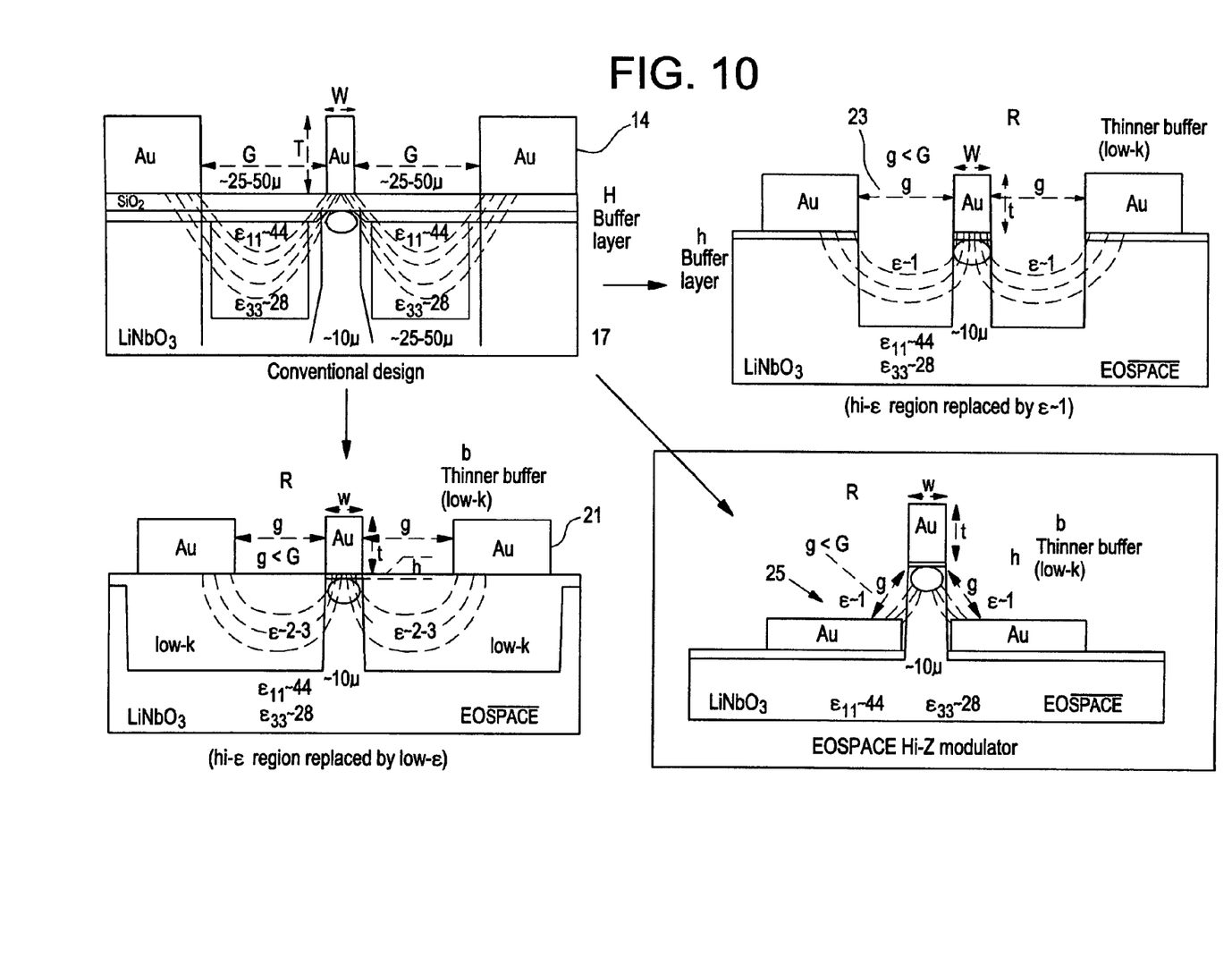
FIG. 10 shows some implementation examples of High-Z LiNbO$_3$ modulators fabricated with tall ridge structure with deep trenches.

FIG. 1 shows unique voltage conversion gain features of High-Z modulator. A calculation of the forward transmitting voltage loss/gain of a TW electrode with a standard 50Ω drive without any impedance matching transition also is shown in FIG. 10. Without any impedance matching transition, the forward transmitting voltage ($V_T$) to the TW electrode can be calculated as $V_T/V_{in}=2Z_T/(Z_T+Z_O)$, where $V_{in}$=input voltage, $Z_T$=characteristic Impedance of the TW transmission-line electrode, and $Z_O$=characteristic Impedance of a standard source, (typically 50 ohm).

Thus, with a typical 40Ω transmission line that of a current conventional TW Z-cut modulator, the forward transmitting voltage to the modulator TW electrode shows an 11% loss in the voltage transmission to the modulating TW electrode. This translates to an ~11% higher drive voltage as compared to a perfect 50Ω T-line. A lower 30Ω TW modulator (typically that of an X-cut modulator) would be even worse.

In contrast, the new High-Z modulator is fabricated on a thin ridge with very deep trenches structure. With unwanted very high-∈ region of $LiNbO_3$, removed, higher transmission line impedance can be achieved. With a ~100Ω TW electrode, we can achieve a $V_T/V_{in}$ voltage conversion gain of 33%, even without any impedance matching, a >44% higher efficiency (or lower Vπ) as compared to a typical current conventional 40π TW modulator.

FIG. 2 shows a new High-Z modulator, with simple quarter wave impedance matching. The new High-Z modulator, with simple quarter-wave impedance matching provides a higher efficiency. To achieve even higher efficiency, bandwidth and reduction in the RF reflection, simple impedance matching can be used. A calculation of voltage transmission loss/gain of a TW modulator with a standard 50-ohm drive with a standard quarter-wave impedance matching transition is shown in FIG. 2. The forward transmitting voltage to the TW electrode can be calculated as $V_T/V_{in}=\{Z_T/50\}^{1/2}$.

FIG. 3 shows that, with simple Z-matching, there is a large voltage gain for High-Z modulator. In the case shown in FIG. 3, with a ~100Ω TW electrode, it is possible to achieve a peak $V_T/V_{in}$ voltage conversion gain of ~41% with an impedance match to a 50Ω drive—an overall >50% higher efficiency as compared to a current conventional 40Ω TW modulator.

With the High-Z TW electrode terminated in its own high-Z impedance, there is no RF reflection from the end of the electrode, and therefore, minimum ripples on the EO response itself throughout the broad frequency range. The only main RF reflection comes at the input to the High-Z T-line, which may require an isolator, if reflection back to the 50 ohm source is an issue. Other type of impedance matching, instead of this simple quarter-wave matching can also be explored.

The new High-Z modulator can also be used for direct antenna driving allows a better match to an antenna, which typically is not 50 ohm, by feeding directly from the higher impedance antenna. The new device structure allows more flexibility to achieve higher impedance to match the antenna and is not limited to 30-40 ohm as in conventional TW modulator.

Realization of the tall thin ridge with very deep trench cuts around the waveguides is advantageous. To achieve High-Z transmission, most of the unneeded very high dielectric $LiNbO_3$ material seen by the electrode is removed. $LiNbO_3$ is a difficult material to be etched to form a clean ridge waveguide structure, without scarifying fabrication yield, higher loss and complex time-consuming fabrication steps. Current etching, ion milling, etc. techniques may not be suitable and may be impractical to achieve in a deeply-etched structure. Since a typical low RF loss TW electrode requires a relatively large electrode spacing of ~20→50 μm wide, therefore the effective E field depth is also in the same order of magnitude ~50 μm in depth. In order to significantly reduce the E field in the high dielectric region, other simpler, lower cost, fabrication techniques must achieve a very deep trench cut >50 μm.

Figure 7:
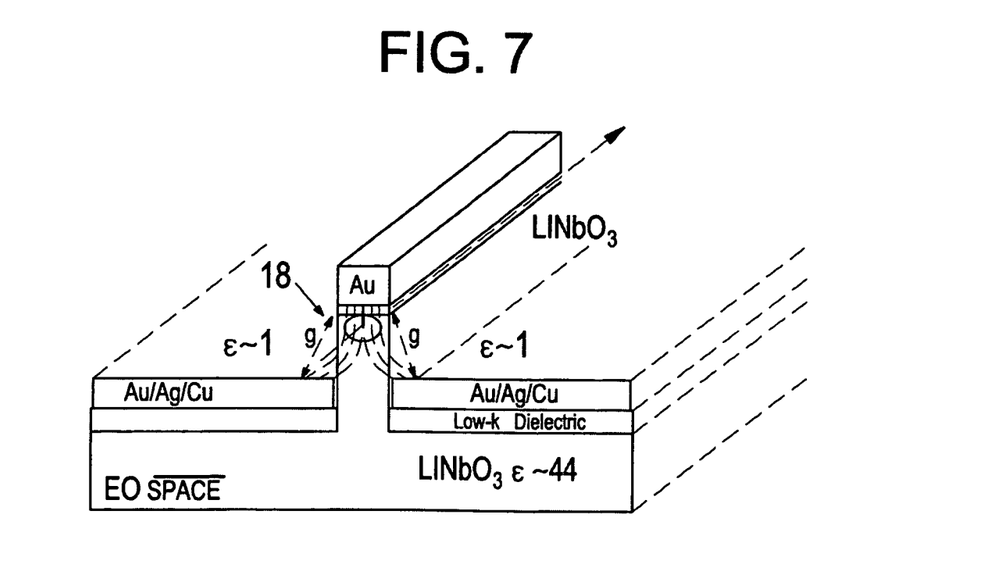
FIG. 7 shows a cross section of an ultra low Vπ, High-Z traveling-wave LiNbO$_3$ modulator.
Figure 11:
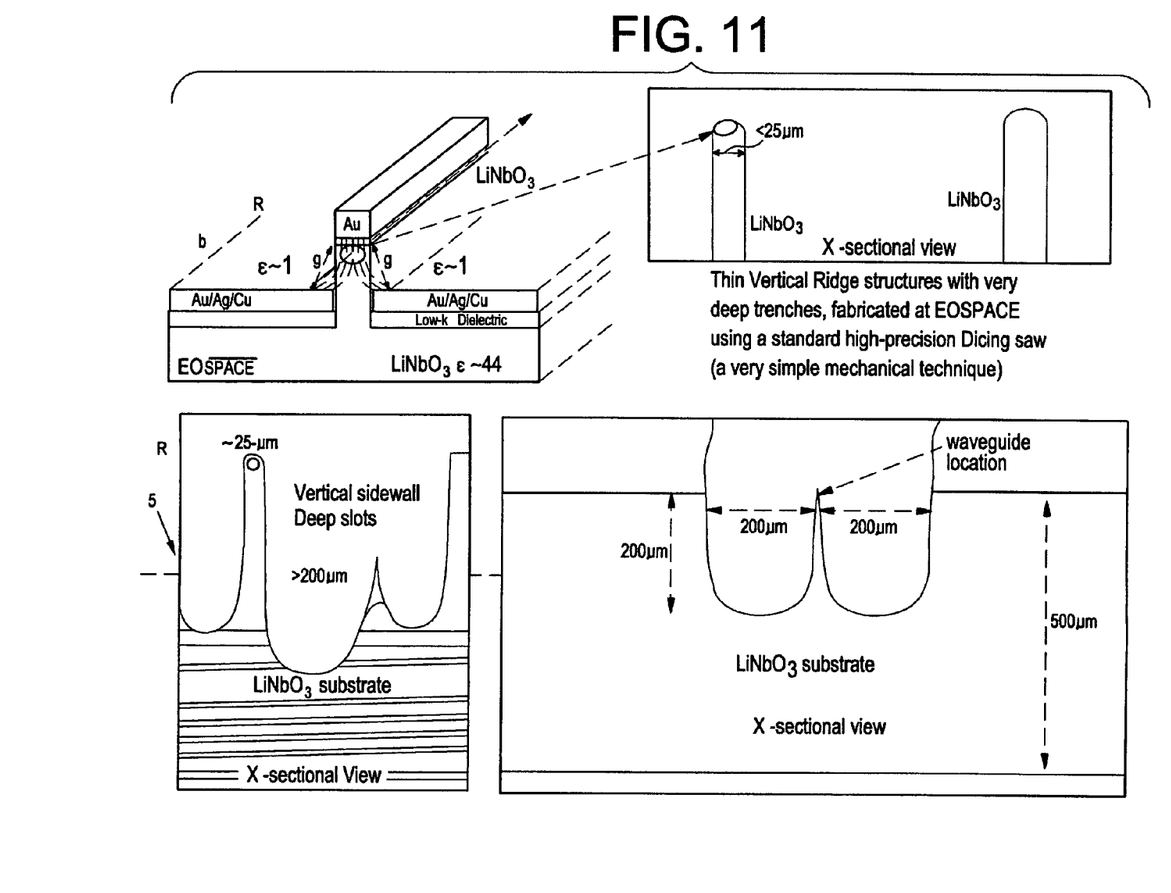
FIG. 11 shows a new High-Z modulator structure.

EOSPACE has successfully demonstrated using a simple mechanical technique, high precision dicing saws with thin blades, to fabricate tall/thin ridge structures accompanied with very deep (>100-200 or more μm) trenches around the waveguide on $LiNbO_3$ substrate. The technique is compatible with low-cost manufacturing processes. Some examples of very tall thin ridge $LiNbO_3$ structures with very deep (>200 μm) trenches are shown in FIGS. 7 and 11. A ridge of <25 μm in width with a deep trench >250 μm is achievable, shown in FIG. 11.

This technique further is improved by choosing the most appropriate saw blade with polishing sides to achieve smooth sidewalls. Note that a low-loss RF electrode may require a large gap as large as 50 μm, and thus it is important to achieve the removal of high dielectric material well over 50 μm in depth.

Figure 5:
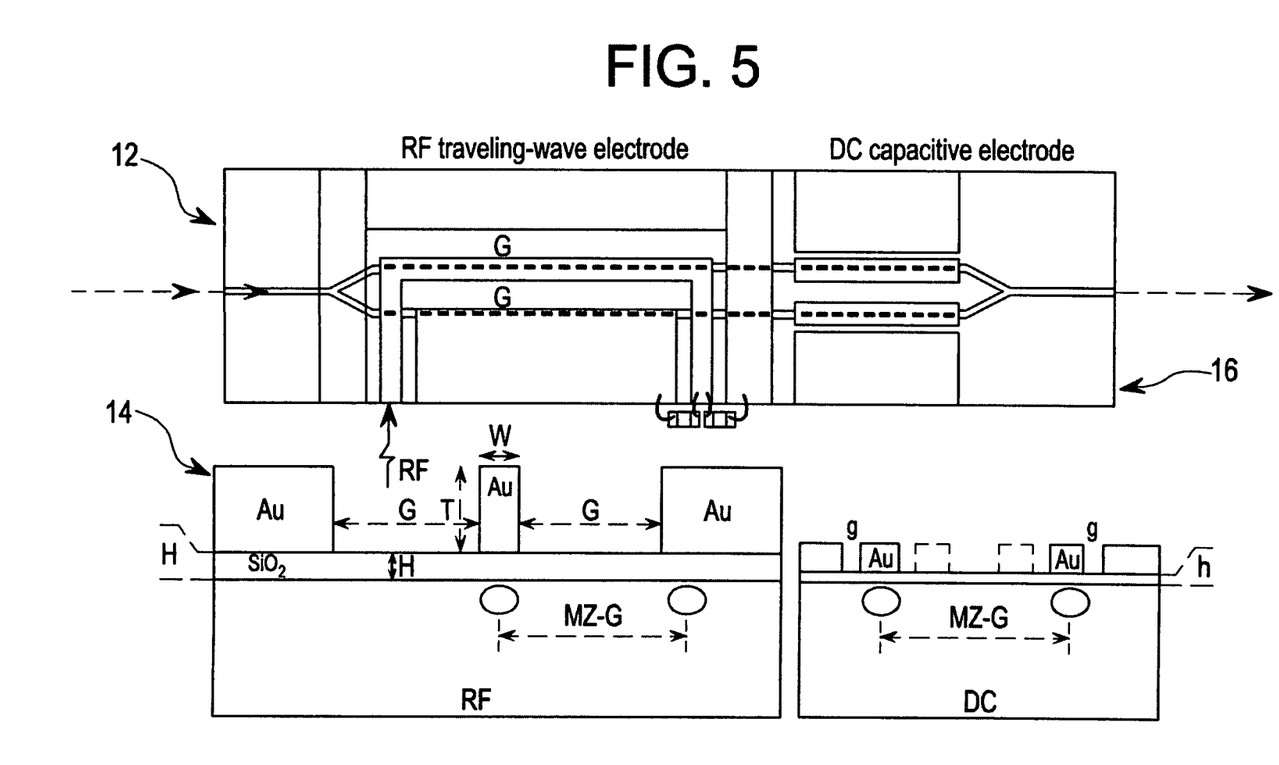
FIG. 5 shows a conventional TW interferometric MZ modulator structure on a planar substrate (or with shallow trenches), used as an RF traveling wave electrode in combination with a DC capacitive electrode.

FIG. 5 shows a conventional TW interferometric MZ modulator 12 structure on a planar substrate, used as an RF traveling wave electrode 14 in combination with a DC capacitive electrode 16.

Figure 6:
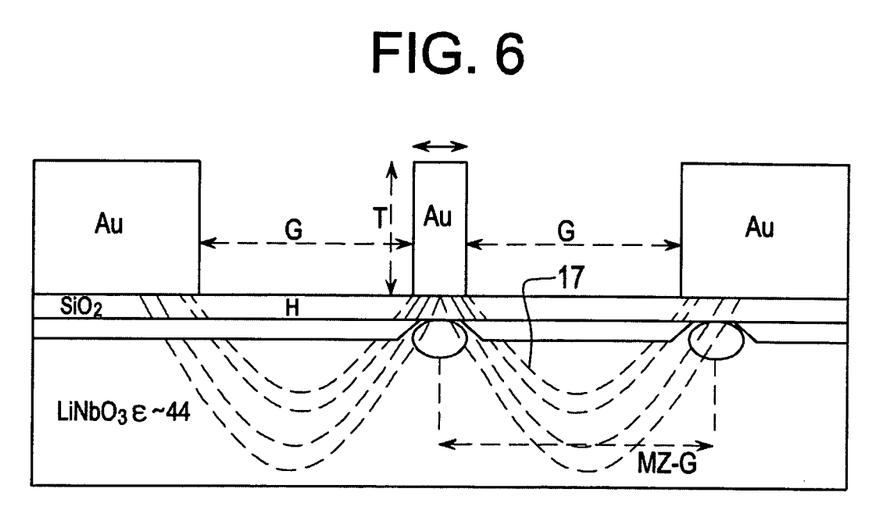
FIG. 6 shows the RF fields in the conventional broadband LiNbO$_3$ TW modulator shown in FIG. 5, with the problem of trade-off in EO overlap integral.

FIG. 6 shows the RF fields in the conventional broadband LiNbO$_3$ TW modulator shown in FIG. 5, with the problem of trade-off in EO overlap integral. Gaps G are wide and the center ridge is wide W, and its height T is the same as the outer electrodes. FIG. 6 shows a conventional broadband LiNbO$_3$ TW modulator with the problem of low-impedance transmission line. A large fraction of the RF field 17 goes through the high-dielectric LiNbO$_3$ outside the waveguide region.

FIG. 7 shows a new High-Z traveling-wave LiNbO$_3$ modulator, with most of the unneeded LiNbO$_3$ material removed. The RF field goes through less of the unneeded LiNbO$_3$ material and with better field direction inside the tall ridge 18 where the waveguide is situated, resulting in better electro-optic interaction and higher-electrode impedance. The electrode gaps g can also be smaller and thus further enhances the electro-optic interaction.

Figure 8:
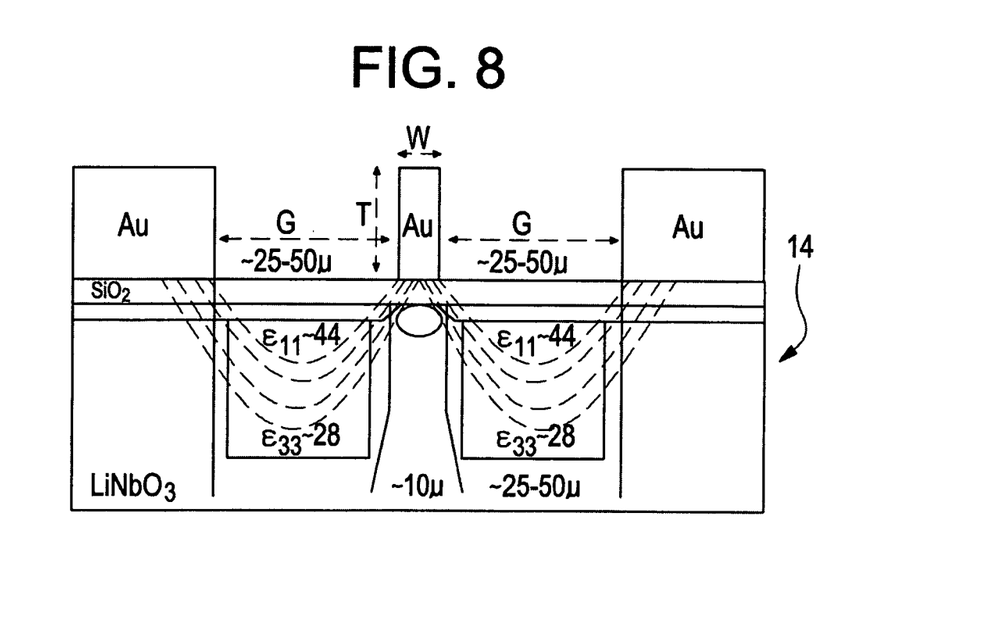
FIG. 8 shows a conventional broadband LiNbO$_3$ TW modulator low-impedance transmission line.
Figure 9:
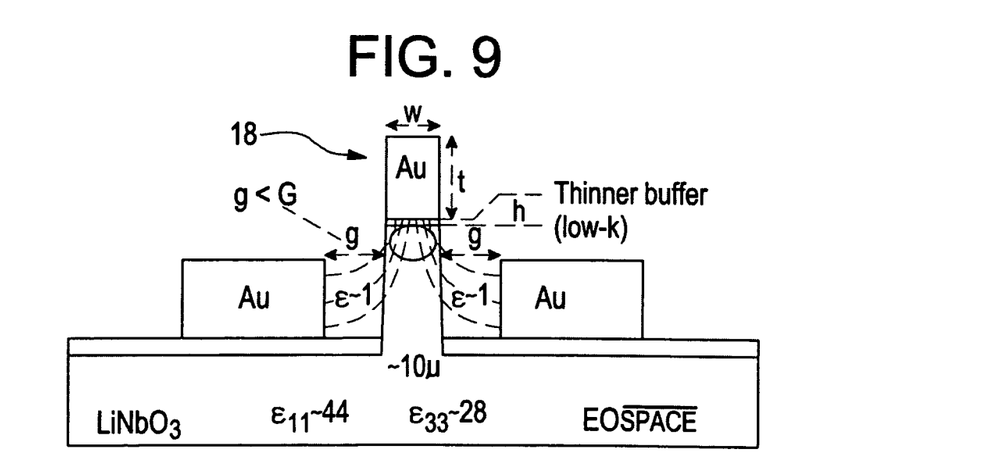
FIG. 9 shows a High-Z LiNbO$_3$ modulator on tall ridge structure with deep trenches.

FIG. 8 shows a conventional traveling-wave LiNbO$_3$ modulator 14 vs. a new High-Z LiNbO$_3$ modulator on tall ridge structure 18 with deep trenches shown in FIG. 9. In the conventional FIG. 8 structure the RF field passes through the high $\in$ materials.

FIG. 9 shows a new High-Z modulator with Z≥50Ω T-line. The RF field is more confined inside the thin ridge where the waveguide resides with smaller gaps g. This results in better field of confinement, and directionality inside the waveguide to produce better electro-optic interaction. The reduction in high-dielectric material wave LiNbO$_3$ seen by the electrode, as compared to the one in FIG. 8, means higher characteristic impedance transmission line is feasible.

FIG. 10 shows some implementation examples of High-Z LiNbO$_3$ modulators fabricated with tall ridge structure with deep trenches. In conventional design 14 shown at the upper left, large portion of the RF fields 17 are in the high $\in$ materials. Examples of new inventions are shown in three forms. The thinner buffer layers b are shown in the tall ridge R, and the RF passes through low K material 21 in the lower left and through air 23, 25 in the upper and lower right hand views. Comparisons may be seen of a conventional design on the upper left and a new High-Z modulator structure on the lower right.

FIG. 11 shows cross sectional views of the new modulator. The vertical ridge R structure, the thin buffer b and small gaps g are shown at the upper left. A cross sectional view is shown at the upper right. The lower views show vertical side wall deep slots S beside the ridge R.

Figure 12:
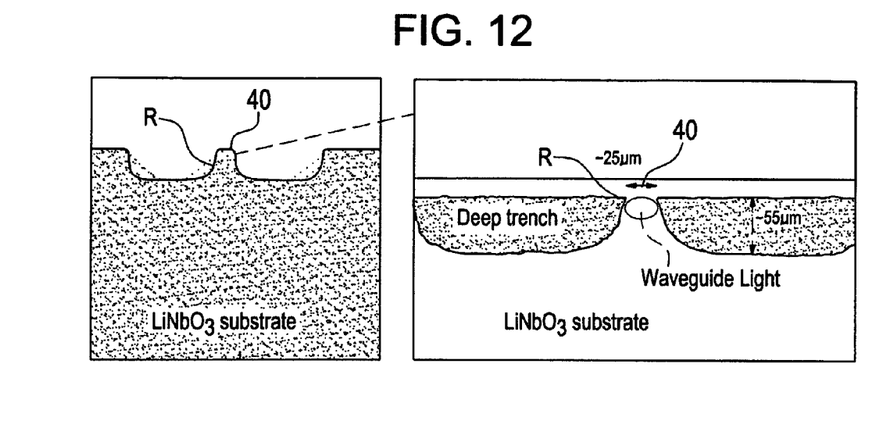
FIG. 12 shows cross section views of the new substrate after most of the high-dielectric material around the waveguide were removed.

FIG. 11 shows thin vertical ridge structures with very deep trenches fabricated at EOSPACE. The structure was formed using high-precision dicing saw. This simple mechanical technique achieves tall thin ridge structures of LiNbO$_3$ material, in which waveguides can be formed without altering or damaging the crystal region where the waveguide resides. Thus all crystal properties and EO coefficients are preserved. FIG. 12 shows a very low loss waveguide fabricated on such a ridge structure. The waveguide was formed first using high temperature diffused waveguide process. The sample was then aligned on the precision dicing saw to form the ridge around the waveguide.

FIG. 12 shows a low loss single mode optical waveguide 40 on a very thin vertical ridge structure R in deep trenches 31 on LiNbO$_3$ in different magnifications.

The particular ridge shown in FIG. 12 is ~25 μm wide with deep trenches of ~55 μm deep. The sample was ~5 cm long with no AR coating. The measured fiber to waveguide to lens without AR coating loss is <1.6 dB, a very low insertion loss. There was no appreciable increase in the waveguide loss before and after the deep trenches had been formed.

This novel LiNbO$_3$ tall ridge with deep trench structure can be made in a fairly short time (<15 minutes) using a commercial high precision dicing saw, and thus is quite practical to implement. The width of the ridge can be controlled by simply moving the cut position which can be accurate to 1 μm. One of the important features is that this thin ridge is still supported by the rest of the rigid LiNbO$_3$ substrate, which thus is still very easy to handle and for post processing, very important to its practicality.

Figure 13:
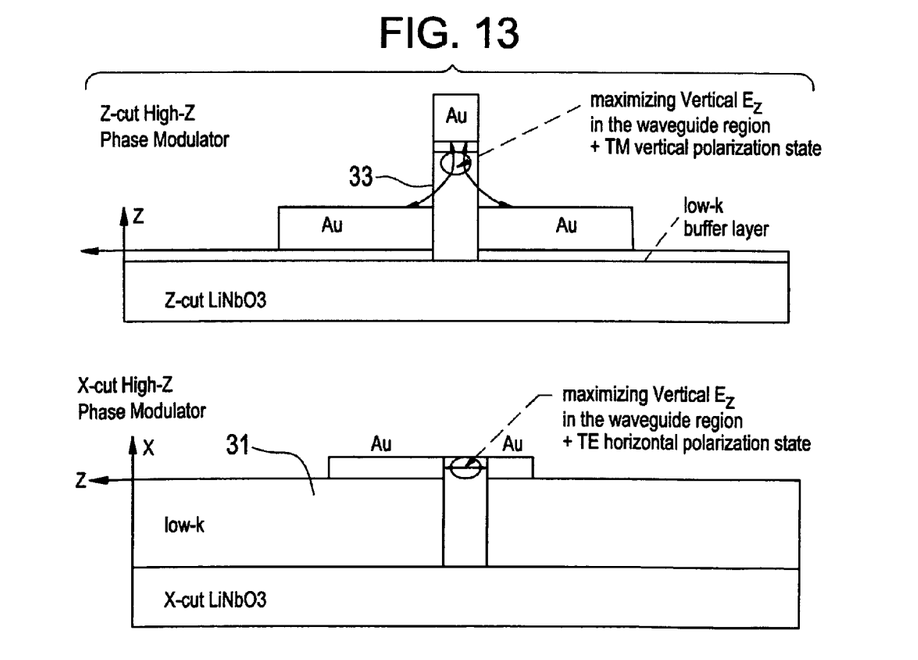
FIG. 13 shows single waveguide structure on Z-cut and X-cut LiNbO$_3$ for High-Z phase modulator structures.

FIG. 13 shows examples of single waveguide structure on Z-cut and X-cut LiNbO$_3$ for High-Z tall ridge phase modulator structures, with most of the unneeded wave LiNbO$_3$ high dielectric material removed and replaced with air 33 and low-k substances 31.

Figure 14:
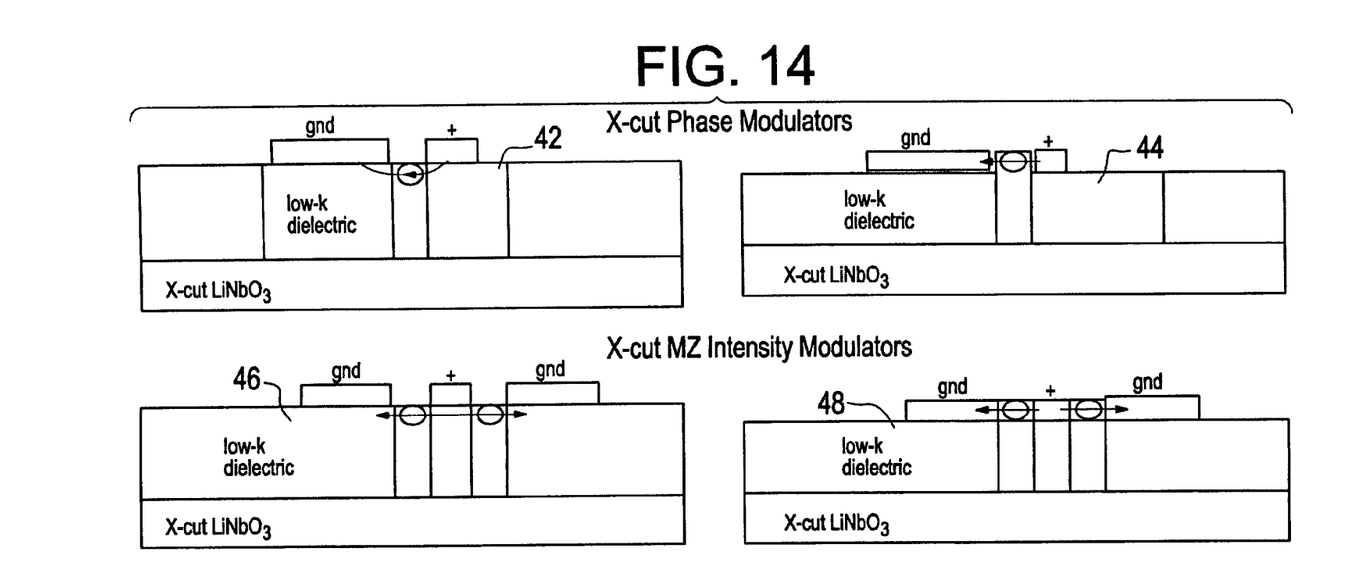
FIG. 14 shows implementation examples of X-cut phase/MZ intensity High-Z TW LiNbO$_3$ modulators.

FIG. 14 shows implementation examples of X-cut phase/MZ intensity High-Z TW LiNbO$_3$ modulators 42, 44, 46, 48.

Figure 15:
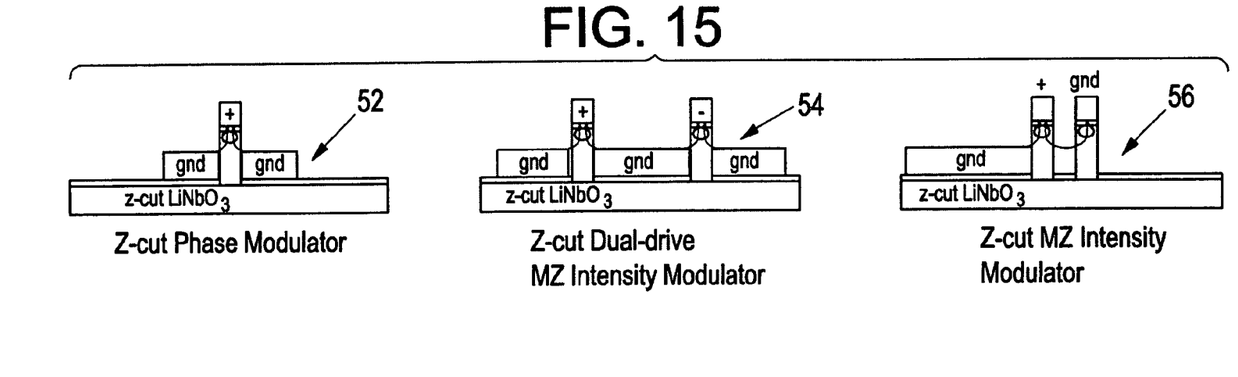
FIG. 15 shows some examples of Z-cut Phase/MZ intensity High-Z TW LiNbO$_3$ modulators.

FIG. 15 shows some examples of Z-cut Phase/MZ intensity High-Z TW LiNbO$_3$ modulators 52, 54, 56.

Figure 16:
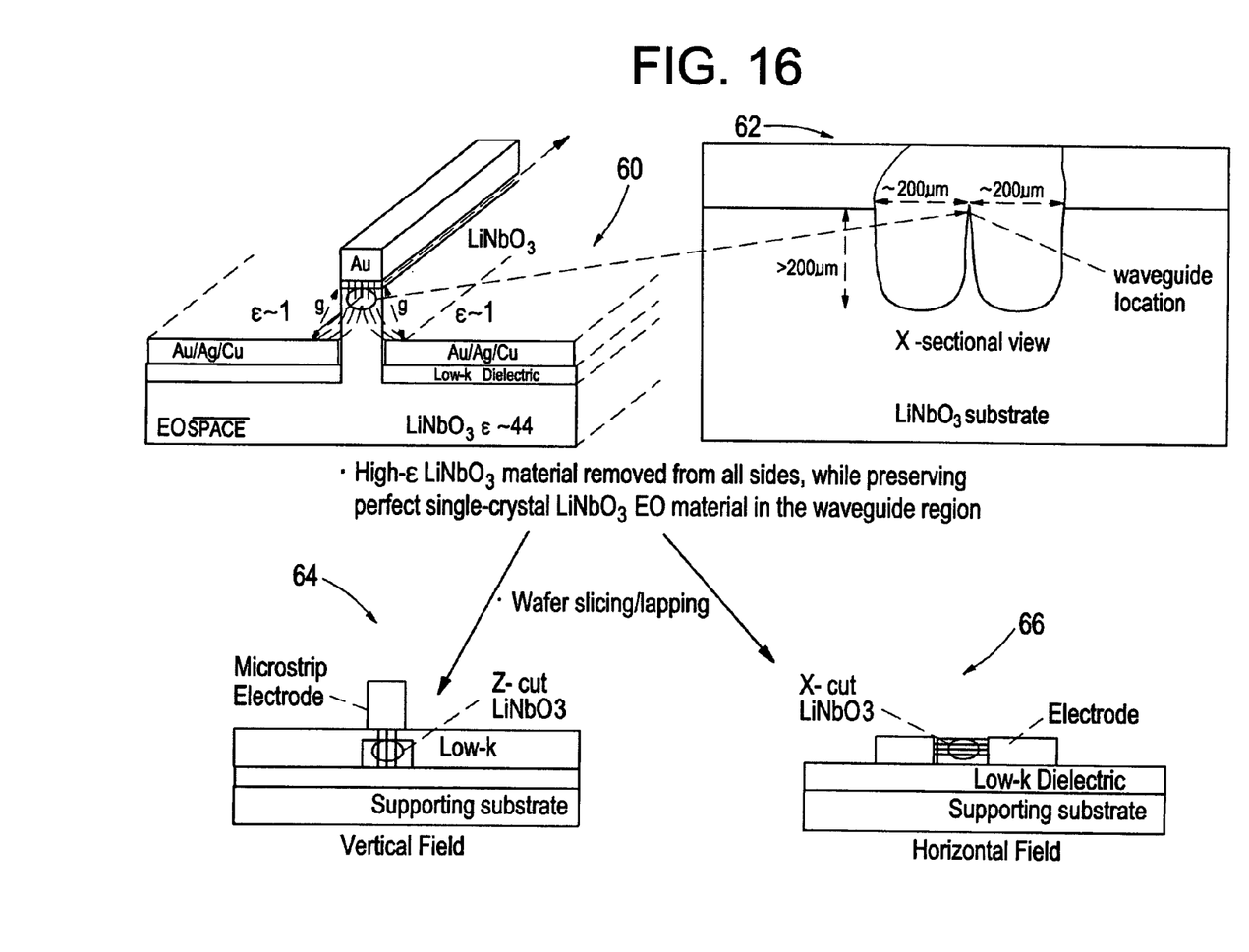
FIG. 16 shows more advanced High-Z modulator structures.

FIG. 16 shows further examples of more advanced High-Z modulator structures 60, 62, 64, 66.

A new High-Z Traveling-wave electro-optical modulator has a traveling-wave transmission-line electrode with higher characteristic impedance (Z) than the driving source (50 ohm). This higher-impedance Traveling-wave optical modulator has the advantage of higher modulation efficiency, owing to higher forward voltage transmitted to the electrode on the modulator from the 50-ohm source.

An optical modulator can be fabricated on electro-optic substrate (such as Lithium niobate, semiconductor and etc.) in which the electro-optic substrate itself may be a high-dielectric material. The new proposed modulator is to be fabricated on these substrate that has been modified so that most of the unneeded high-dielectric material that of the electro-optic substrate itself around the optical waveguide region are removed and replaced with air or lower dielectric material. The waveguide will be on a thin ridge structure with deep trenches, instead of a convention planar substrate.

With most of the high-dielectric material removed from the deep trenches around the optical waveguide, new transmission-line electrode can be made in which the electrode sees a lower overall dielectric constants, making it easier to achieve high characteristic impedance.

It also allow higher RF signal propoagation speed (in case of Lithium Niobate modulator) so that it is easier to design Transmission-line electrode to achieve velocity matching condition between the co-propagating RF modulationg signal and optical wave interaction (for maximum bandwidth and efficiency), with less compromization in the design as in case of conventional traveling-wave modulator on planar electro-optic substrate.

With most of the unneeded material around the waveguide removed, electrode can be designed with better access to the waveguide region, with improved proper field alignment within the optical waveguide leading to higher electro-optic field overlap and interaction inside the waveguide, resulting in higher modulation efficiency.

To realize such a traveling-wave modulator fabricated on a tall thin ridge with deep trench structure on electro-optic substrate, in which most of the unnecessary high dielectric material around the waveguides removed, we propose a simple micromechanical means, namely the use of high-precision dicing saw to effectively carve-out the deep trenches, removing these unneeded high-dielectric material around the waveguide on the ridge area. Unlike some other time-consuming and complex techniques including ion milling, reactive ion etching to form a ridge around the waveguide, only relatively shallow ridge can be formed, and with complex fabrication procedure, our technique can achieve tall thin ridge with very deep trenches while preserving high quality waveguide and with minimum processing time and complexity. This fabrication technique is one of the key implementation for this invention to create high-quality thin tall ridge structure with deep trenches, allowing new high-impedance transmission-line electrode structure, as well as making it possible to design electrode with much better access to the waveguide region.

While the invention has been described with reference to specific embodiments, modifications and variations of the invention may be constructed without departing from the scope of the invention, which is defined in the following claims.

I claim:

1. A traveling-wave optical modulator comprising a transmission-line electrode having a high characteristic impedance Z greater than 50Ω and an optical waveguide fabricated on an electro-optic high-dielectric substrate made of crystalline lithium niobate, other ferroelectric material, semiconductor, or polymer, in which most of the crystalline high-dielectric substrate material around a region of the optical waveguide has been saw cut to a depth of greater than 5 to ~200 μm, removed and has been replaced with a low-dielectric material or air.

2. The traveling-wave optical modulator of claim 1, further comprising an electro-optic substrate, an optical waveguide on the substrate, a ridge around the waveguide formed by removing substrate material surrounding the ridge and the waveguide without altering or damaging a crystal region of the substrate where the waveguide resides, and a transmission-line electrode on the substrate around the waveguide.

3. The traveling-wave optical modulator of claim 2 wherein the ridge is integral with and supported by a remainder of the substrate, thereby providing a robust structure for easy handling and post processing.

4. The traveling-wave optical modulator of claim 1, further comprising a substrate, a thin ridge formed within a surface in the substrate, a waveguide on the surface of the ridge, and trenches in the substrate on sides of the thin ridge.

5. The traveling-wave optical modulator of claim 4, wherein the trenches have been formed by one or more precision dicing saws cutting the trenches on either side of the waveguide on the thin ridge with the one or more dicing saws, thereby forming the trenches around the waveguide by removing portions of substrate material around the waveguide.

6. A traveling-wave optical modulator, comprising a crystalline substrate, a thin ridge structure on the crystalline substrate, a waveguide on the thin ridge structure, deep trenches, saw cut in the substrate material around the waveguide on the thin ridge, the saw cut substrate material having been removed from the trenches and replaced with a substance having a dielectric constant lower than that of the substrate, a transmission-line electrode structure fabricated on the substrate, with most of the substrate material having been removed and replaced with the lower dielectric material, thereby improving efficiency and RF speed of the optical modulator and increasing transmission line impedance.

7. The traveling-wave optical modulator of claim 6, wherein the substrate is made of crystalline LiNbO$_3$, a semiconductor, polymer, or ferroelectric material.

8. The traveling-wave optical modulator of claim 6, wherein the substance with a dielectric constant lower than the substrate is air.

9. The traveling-wave optical modulator of claim 6, wherein the substance with a dielectric constant lower than the substrate has a dielectric constant of three or less.

10. The traveling-wave optical modulator of claim 6, wherein most of the substrate material has been removed around the waveguide on the thin ridge, thereby providing the transmission line electrode structure with smaller electrode spacing, higher electric field and better access to a region of the waveguide, and thus increasing electro-optic modulation efficiency.

11. The traveling-wave optical modulator of claim 6, wherein most of the substrate material is removed around the waveguide on the thin ridge, and wherein the transmission line electrode structure has a thin buffer layer or no buffer layer, which enhances an electric field inside the waveguide and thus increases electro-optic modulation efficiency.

12. The traveling-wave optical modulator of claim 6, wherein most of the substrate material removed around the waveguide on the thin ridge, and in the transmission line electrode structure the RF electrode and ground electrode are on different levels.

13. The traveling-wave optical modulator of claim 12, wherein the RF electrode is on top of the ridge structure, and the ground electrode is on a bottom of the trenches below a level of the waveguide for enhancing a vertical electric field inside the waveguide, leading to higher electro-optic modulation efficiency.

14. The traveling-wave modulator of claim 13, wherein the modulator is a z-cut LiNbO3 modulator, in which the vertical electric field is maximized inside the waveguide.

15. The traveling-wave optical modulator of claim 6, wherein most of the substrate material is removed around the waveguide on the thin ridge, providing a transmission line electrode structure with an RF electrode and with ground electrodes below a substrate surface level so that the RF electrode is on a same level with the waveguide, which enhances a horizontal electric field inside the waveguide, leading to higher electro-optic modulation efficiency.

16. The traveling-wave optical modulator of claim 15, wherein the modulator is an X-cut LiNbO3 modulator in which the horizontal electric field is maximized inside the waveguide.

17. The traveling-wave optical modulator of claim 6 wherein the ridge structure and trenches have smooth and near-vertical sidewalls.

18. A traveling-wave optical modulator, comprising a crystalline substrate, a thin ridge structure on the crystalline substrate, a waveguide on the thin ridge structure, deep trenches, saw cut in the substrate material around the waveguide on the thin ridge, the saw cut substrate material having been removed from the trenches and replaced with a substance having a dielectric constant lower than that of the substrate, a transmission-line electrode structure fabricated on the substrate, with most of the substrate material having been removed and replaced with the lower dielectric material, thereby improving efficiency and RF speed of the optical modulator and increasing transmission line impedance, and wherein the thin ridge structure is tall and the trenches are greater than 5-200 or more μm deep.

19. The traveling-wave optical modulator of claim 18 wherein the thin ridge structure is less than 15 μm in width and the trenches are greater than 5-200 or more μm deep.

\* \* \* \* \*